UNITED STATES PATENT OFFICE.

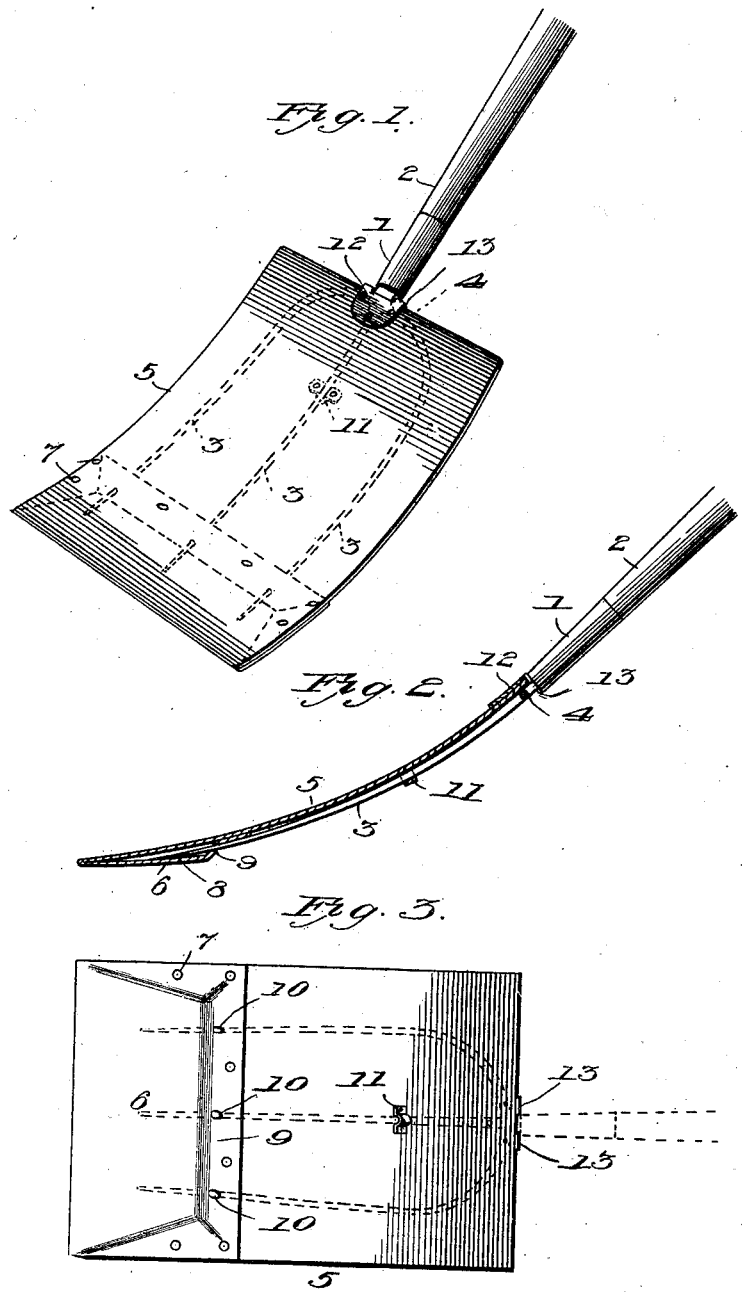

WILLIAM T. SPILLANE, OF RED LAKE FALLS, MINNESOTA.

SHOVEL ATTACHMENT.

SPECIFICATION forming part of Letters Patent No. 707,948, dated August 26, 1902.

Application filed March 26, 1902. Serial No. 100,084. (No model.)

*To all whom it may concern:*

Be it known that I, WILLIAM T. SPILLANE, a citizen of the United States, residing at Red Lake Falls, in the county of Red Lake and State of Minnesota, have invented certain new and useful Improvements in Shovel Attachments, of which the following is a specification.

This invention relates to a shovel attachment for forks and the like; and the main object of the same is to provide a simple and effective device of this class which is adapted to be applied to a fork having any number of tines to quickly convert the fork into a flat shovel or scoop and protect the points of the tines, the attachment having features of construction which operate to firmly hold it to the fork tines and head.

The invention consists in the construction and arrangement of the several parts, which will be more fully hereinafter described and claimed.

In the drawings, Figure 1 is a perspective view of the improved attachment shown applied to a fork, illustrated in dotted lines and having the handle partially broken away. Fig. 2 is a longitudinal vertical section through the attachment and fork. Fig. 3 is a bottom plan view of the attachment, showing the fork in dotted lines in applied position.

Similar numerals of reference are employed to indicate corresponding parts in the several views.

The numeral 1 designates a fork of any ordinary form of construction, having a handle 2 and a series of tines 3, extending from a head 4.

The improved attachment comprises a substantially rectangular strip 5 of sheet-iron or other suitable sheet metal which is longitudinally bowed and has the lower end 6 rebent under the adjacent portion and secured by rivets or analogous fastenings 7, the lower bent end being struck downwardly adjacent to the rear terminal thereof to provide a pocket 8 and form a rear inclined shoulder 9, extending transversely of the shovel attachment. The shoulder 9 is formed with a plurality of apertures 10, spaced apart a distance equal to that between the tines 3 of the fork, the pointed extremities of the fork-tines being adapted to be pushed through the said apertures into the pocket 8 to shield them from injury.

On the under side of the shovel attachment a clip 11 is secured and is disposed in alinement with the longitudinal center of the attachment to receive the center tine 3 and serve as an auxiliary holding and supporting means.

At the upper end of the center of the front side of the shovel attachment a yoke 12 is riveted or otherwise secured and has arms 13, which are adapted to be bent over the head 4 of the fork close to the forward extremity of the fork-tine connecting with said head.

The lower rebent end 6 of the shovel attachment is gradually inclined upwardly from the doubled portion from which the said rebent end starts to cause the said lower end of the attachment to move easily over a floor or other surface in the operation of using the shovel in loading the same. Furthermore, this rebent end 6 provides a reinforce for the lower end of the shovel and increases its wearing qualities.

In applying the shovel attachment to a fork the tines are slipped downwardly close to the back of the same, the center tine being pushed through the clip 11 and the forward extremities of all the tines inserted in the apertures 10 until the head of the fork is disposed under the yoke 12. The arms 13 of the yoke are then bent over the head and the shovel attachment is firmly secured to the fork and ready for use. It will be seen that the arms 13 of the yoke prevent the fork from becoming accidentally disengaged, and the clip 11 acts as an efficient auxiliary to obstruct such disconnection of the fork. In disconnecting the fork the arms 13 of the yoke are bent upwardly, and thereby relieve the head of said fork, so that the latter may be withdrawn from the shovel attachment.

Particular attention is directed to the retaining effect established by the combined use of the clip 11 and the yoke 12, having the arms 13, in view of the tension exerted by the said parts on the fork when in engagement with the shovel attachment. It will also be seen that the longitudinal bow shape of the shovel attachment is intended to conform to the similar bow of the fork-tines. This is also essential in rendering the fastening devices effective and provides for a reduced number of such fastenings to render the application of the attachment positive.

The improved shovel attachment is also adapted to be applied to forks having different lengths of tines, and it does not require a specially-made fork to conform to its construction.

Having thus fully described the invention, what is claimed as new is—

1. The combination with a fork, of a removable shovel attachment comprising a strip of sheet metal rebent under its lower end and struck downwardly, reinforcing such end and forming a pocket receiving and inclosing the extremities of the fork, the downwardly-struck portions of the attachment providing a rear shoulder having a series of apertures receiving the extremities of the fork, and fastening means on the attachment to engage the upper part of the fork.

2. The combination with a fork, of a removable shovel attachment comprising a sheet-metal strip which is bowed longitudinally and has the lower end rebent under and struck downwardly for reinforcing such end and forming a pocket receiving and inclosing the forward extremities of the fork-tines, a clip in the center of the under side of the attachment through which the center fork-tine is inserted, and an upper yoke having bendable arms to engage the head of the fork.

In testimony whereof I affix my signature in presence of two witnesses.

WILLIAM T. SPILLANE.

Witnesses:
F. A. GRADY,
JOHN GRADY.